(12) United States Patent
Gordon

(10) Patent No.: US 10,835,891 B2
(45) Date of Patent: *Nov. 17, 2020

(54) REMOVAL OF OZONE FROM ELECTROKINETIC DEVICES

(71) Applicant: INSPIROTEC, INC., Lake Bluff, IL (US)

(72) Inventor: Julian Gordon, Lisle, IL (US)

(73) Assignee: Inspirotec, Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/225,824

(22) Filed: Dec. 19, 2018

(65) Prior Publication Data

US 2019/0126245 A1    May 2, 2019

Related U.S. Application Data

(62) Division of application No. 15/144,224, filed on May 2, 2016, now Pat. No. 10,245,577.

(60) Provisional application No. 62/157,177, filed on May 5, 2015.

(51) Int. Cl.
| | | |
|---|---|---|
| *B01J 23/34* | (2006.01) | |
| *F04D 33/00* | (2006.01) | |
| *B01J 35/04* | (2006.01) | |
| *B01J 37/02* | (2006.01) | |

(52) U.S. Cl.
CPC .............. *B01J 23/34* (2013.01); *B01J 35/04* (2013.01); *B01J 37/0215* (2013.01); *F04D 33/00* (2013.01)

(58) Field of Classification Search
None
See application file for complete search history.

(56) References Cited

U.S. PATENT DOCUMENTS

| | | | | |
|---|---|---|---|---|
| 4,871,709 A | * | 10/1989 | Tatsushima | B01J 23/34 502/324 |
| 6,096,277 A | * | 8/2000 | Campbell | B01D 53/864 423/219 |
| 10,245,577 B2 | * | 4/2019 | Gordon | B01J 23/34 |
| 2009/0185968 A1 | * | 7/2009 | Galligan | B01D 53/8668 423/219 |
| 2009/0202397 A1 | * | 8/2009 | Parker | B01D 53/8675 422/121 |

* cited by examiner

*Primary Examiner* — Kishor Mayekar
(74) *Attorney, Agent, or Firm* — Wood, Phillips, Katz, Clark & Mortimer

(57) ABSTRACT

Electrokinetic devices and methods are described with the purpose of propelling a dielectric fluid medium, usually air, and optionally collecting assayable agents from the medium. Electrokinetic flow may be induced by the use of plasma generation at high voltage electrodes and consequent transport of charged particles in an electric voltage gradient. The generation of electrokinetic flow has the disadvantage that certain amounts of ozone may be formed in the process. Methods and devices are described herein where suitable catalysts can be combined with the electrokinetic device in such a way that ozone is effectively destroyed in the effluent flow without compromising the amount of flow.

13 Claims, 12 Drawing Sheets

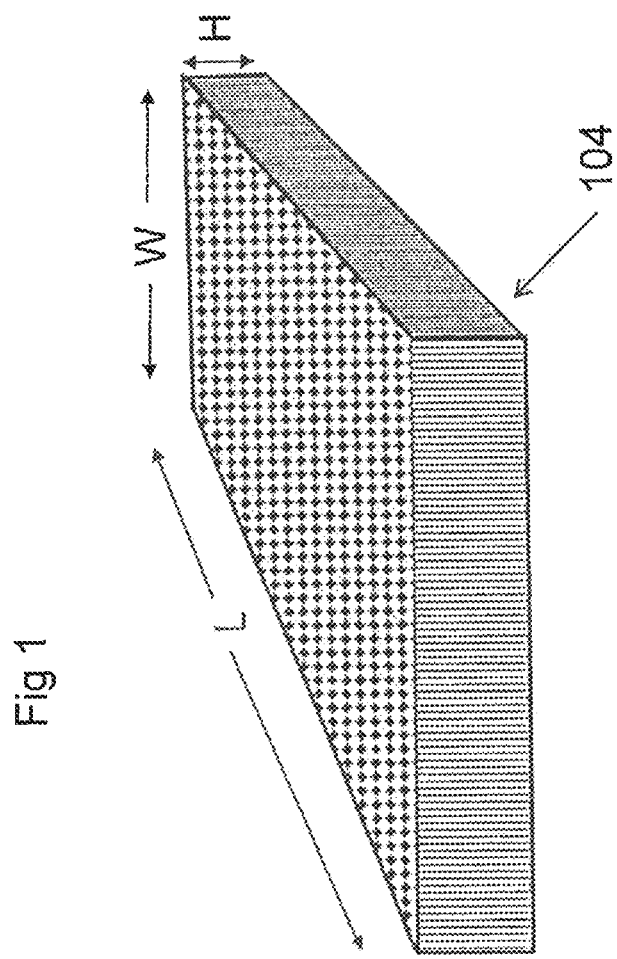

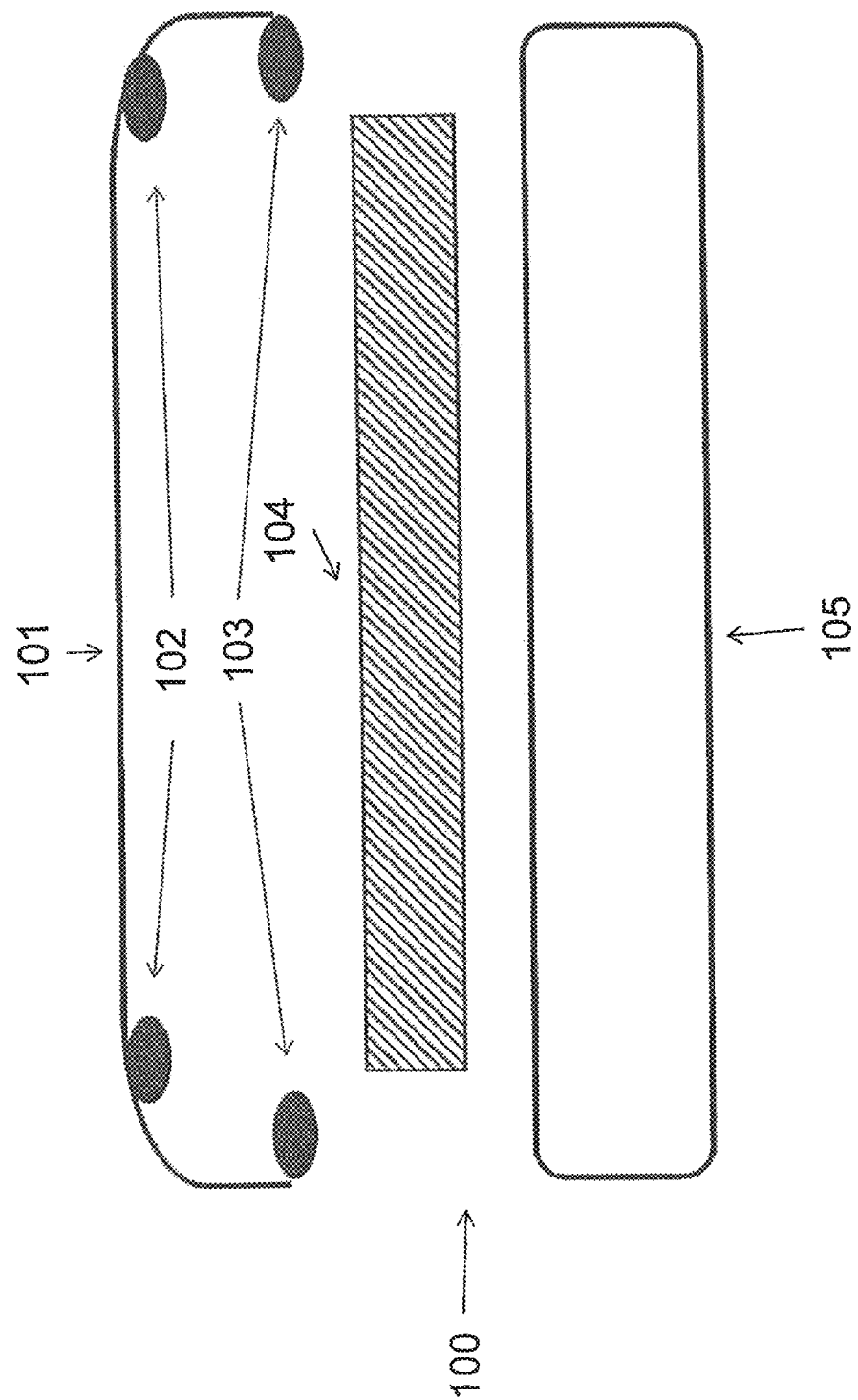

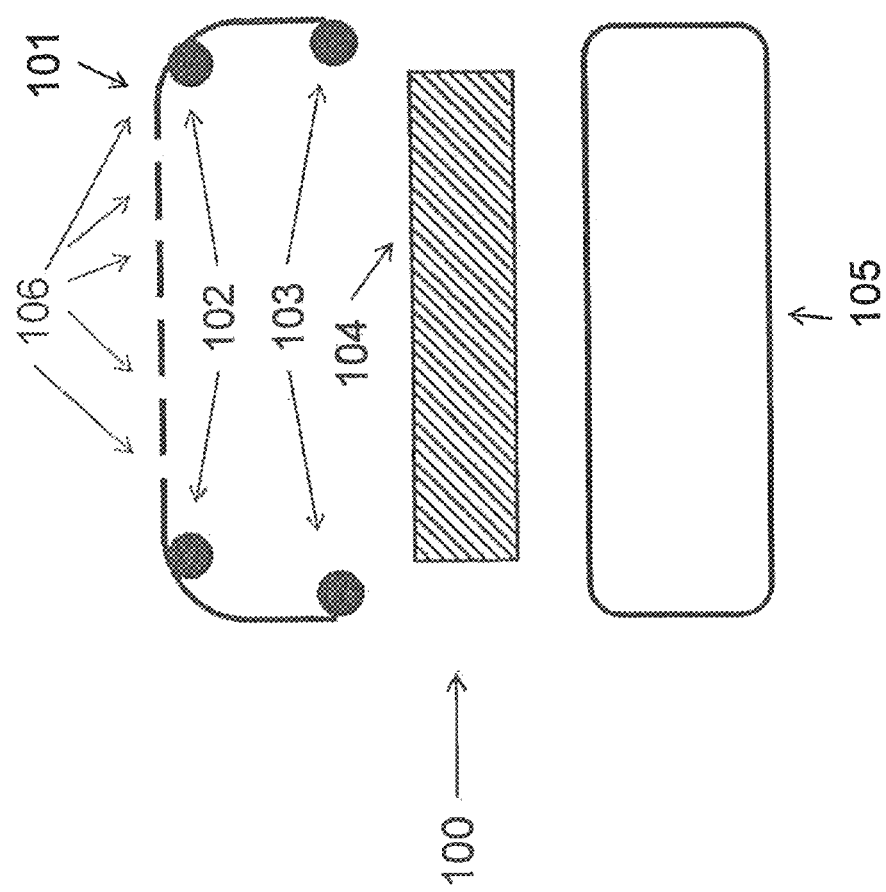

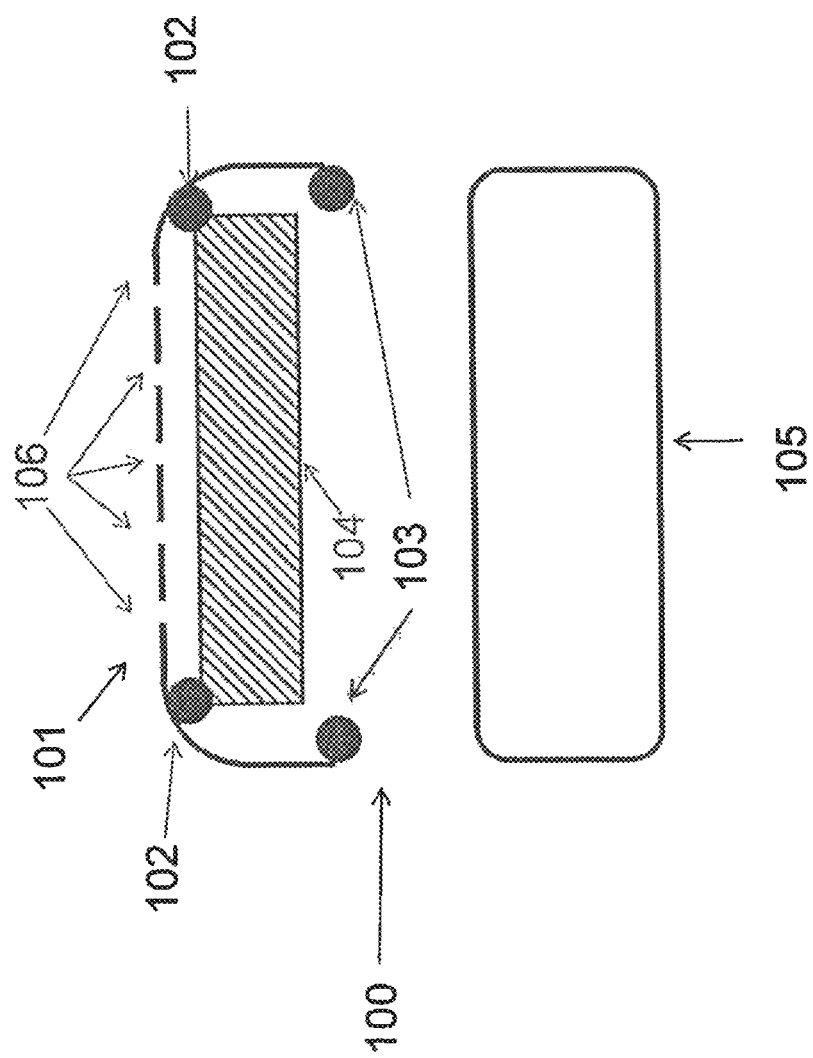

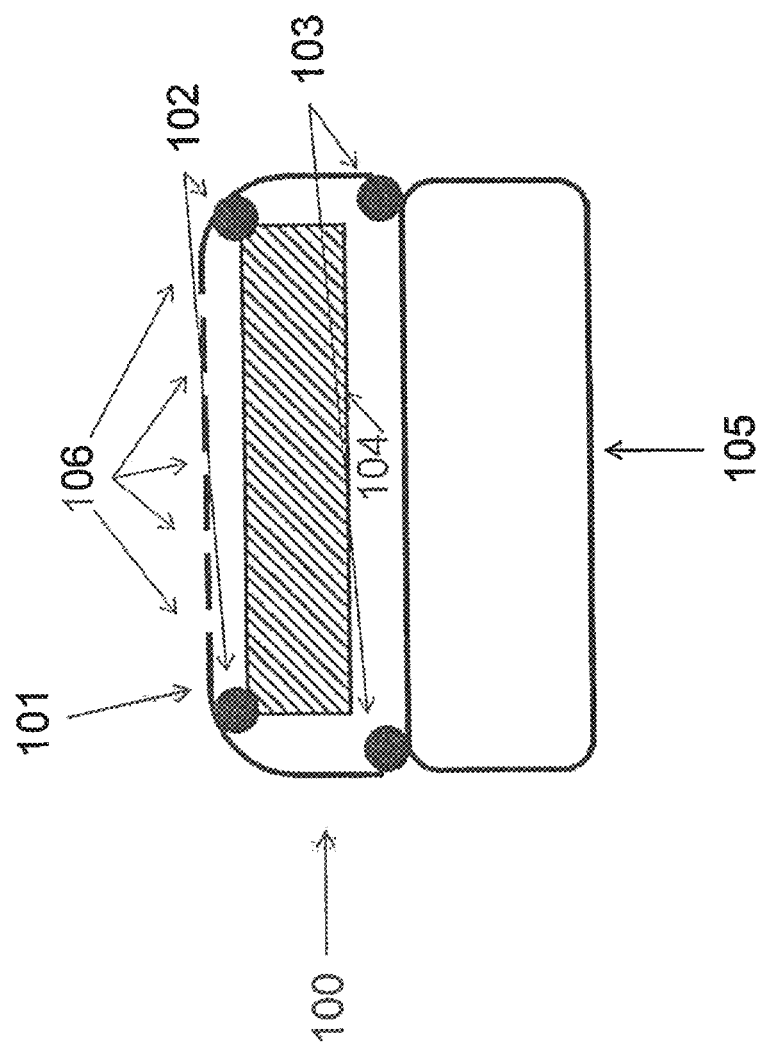

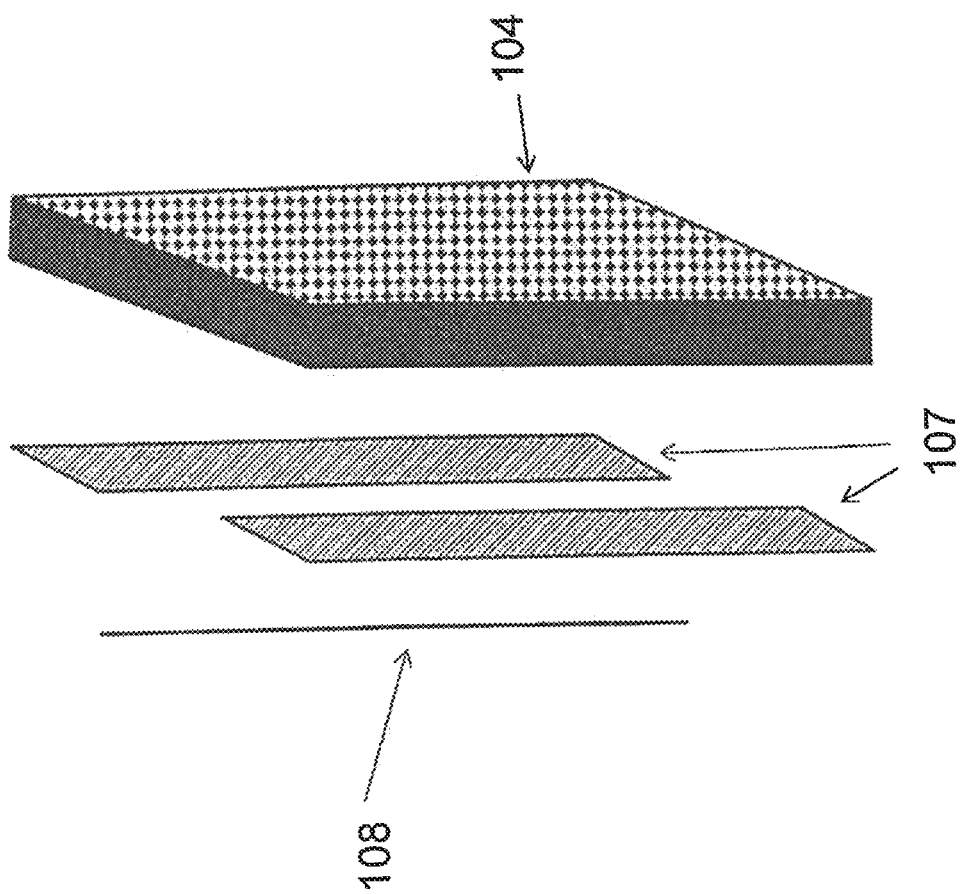

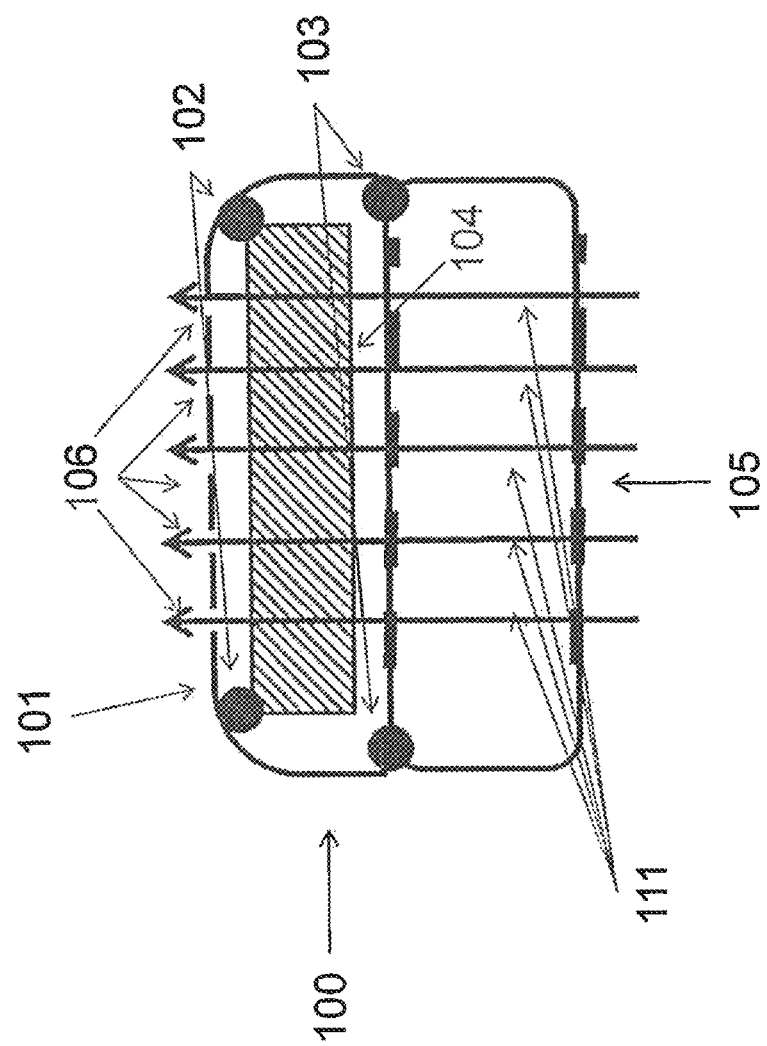

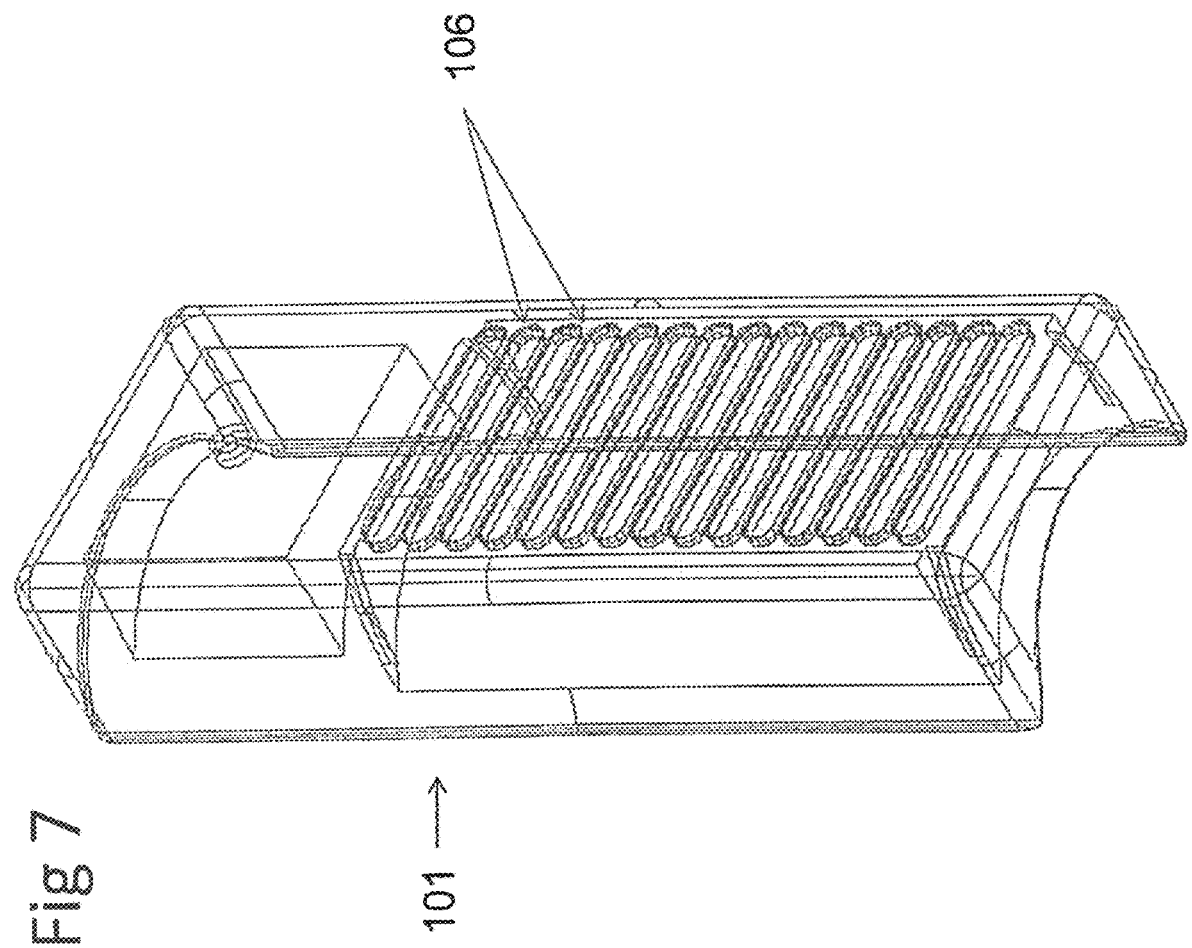

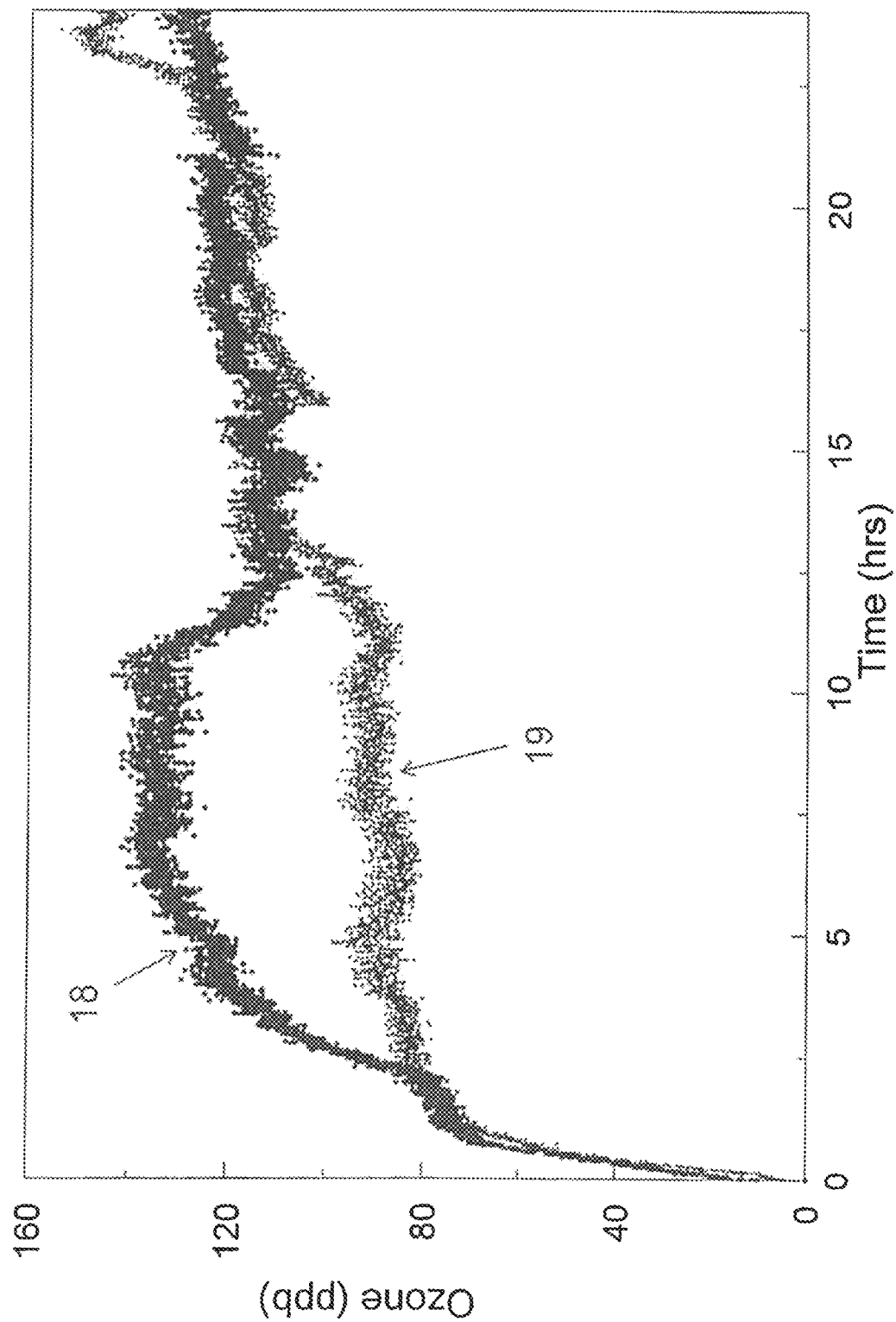

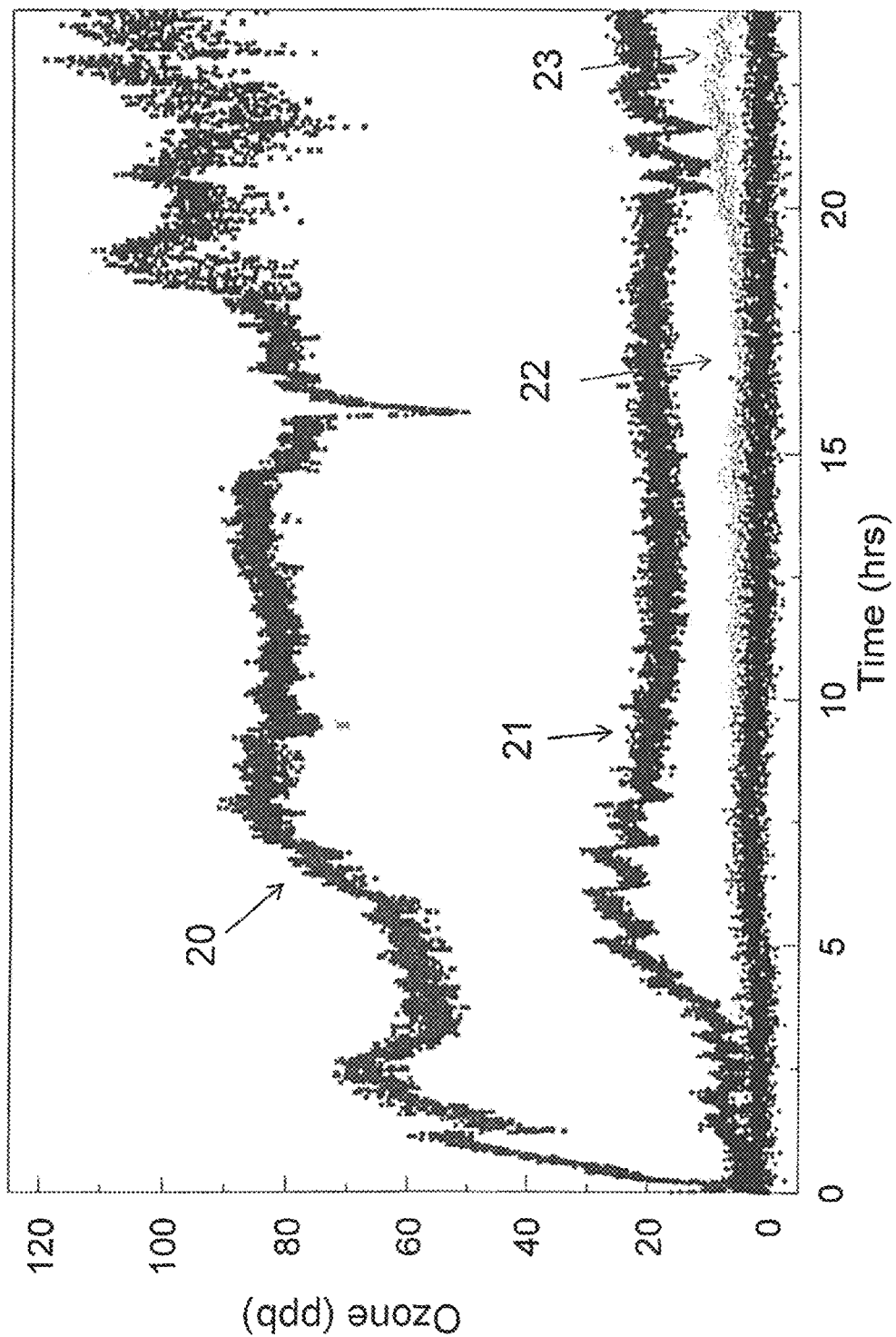

REMOVAL OF OZONE FROM ELECTROKINETIC DEVICES

FIELD OF THE INVENTION

The present invention relates to the propulsion of fluid and collection of and sampling of assayable agents in a dielectric medium. This includes ionic propulsion devices for air cleaning and sampling air for agents whose presence or absence is determinable by bio-specific assays. While the present invention is equally applicable to air cleaning or air sampling devices, we have a particular interest in the application to the field of capture of aerosol particles for analytical purposes. The field includes sampling of air for biological agents, direction to, and deposition on, a collection means for an assay device. The agent-specific assays may include immunoassays, nucleic acid hybridization assays, or any other assays entailing ligand—antiligand interactions. Assays may include, but are not limited to, detection means which are colorometric, fluorescent, turbidimetric, electrochemical or voltammetric. Agents assayed include, but are not limited to, bio-warfare agents, pathogens, allergens or pollutants. Pathogens include screening for infectious airborne agents such as anthrax or tuberculosis organisms.

BACKGROUND

Electrokinetic-based air cleaning systems have been developed and formerly commercialized in the United States by the company Sharper Image under the trade name Ionic Breeze. The original electrokinetic principle was enunciated by Brown in U.S. Pat. No. 2,949,550. This was further improved by Lee in U.S. Pat. No. 4,789,801 for improving airflow and minimizing ozone generation by voltage control. In addition, Lee in U.S. Pat. No. 6,603,268 described methods for coating electrodes with catalyst to destroy the ozone generated. It is well-known that MnO2 is an effective catalyst for conversion of $O_3$ to $O_2$ and is not consumed in the process. Ozone is catalytically degraded according to the process shown in FIG. 10. Thus, the manganese dioxide is not consumed in the process and can be re-used indefinitely.

Strategies have been described for reduction of ozone produced by ionic propulsion such as Lee et al U.S. Pat. No. 4,789,801. Sharper Image also commercialized a post-market device for removal of ozone, the Ozone Guard, which clamped on the outlet and has a metal honeycomb structure which likely was coated with catalyst. In the foregoing descriptions of devices using electrokinetic propulsion, a common element is a high voltage electrode consisting of a wire. A very steep voltage gradient is generated orthogonally to the wire because of the very small cross-sectional area of the wire. The high voltage gradient causes the creation of a plasma consisting of charged particles, and kinetic energy is imparted to the charged particles by the high voltage gradient. The resulting net air flow is created by exchange of kinetic energy between charged and uncharged particles, and the net air flow is directed by the juxtaposition of planar electrodes which are at zero or opposite sign voltage to that of the wire electrode. Charged particles are electrostatically precipitated on to the planar electrodes, which may periodically be removed for cleaning. As first described by Custis et al (Cin. Exp. Allergy 2003, 33, 986-991), the Ionic Breeze device has been adapted for sample collection for allergen analysis by wiping down the electrodes with a paper tissue. The allergens were extracted from the tissue and subject to an immuno-assay. The Ionic Breeze was also used in the works of Peters et al (J. Urban Health 2007, 84, 185-197) and Platts-Mills et al (J. Allergy & Clin. Immunol, 2005, 116, 384-389) for allergen collection for immunoassay analysis. More recent work has focused on the adaptation of a small device with optimized electrode configuration for efficiently collecting samples for testing (Gordon et al. American Association for Aerosol Research. 2013. http://aaarabstracts.com/2013/viewabstract.php?pid=35; Gordon J, J. Allergy Clin. Immunol. (2012) 129(2):AB92-AB92; Gordon et al (2013), J. Allergy Clin. Immunol. 131(2): AB76-AB76; Gordon et al (2014). J. Allergy Clin. Immunol. 133(2):AB187-AB187; Gandhi, et al, (2015) Journal of Allergy and Clinical Immunology, Vol. 135, Issue 2, AB384; Gordon et al (2015) Journal of Allergy and Clinical Immunology, Vol. 135, Issue 2). It is particularly important that such devices do not emit irritating substances such as ozone since they may be run in the presence of patients who have respiratory disorders and thus be particularly susceptible. Tatsushima and Sukura in U.S. Pat. No. 4,871,709 describe methods for fabrication of ozone cracking catalysts with fine structure that provides low resistance to flow, but do not anticipate applications to ion-propulsion devices.

In spite of efforts to limit ozone emission, the commercial devices were unsuccessful. Described herein is a device and method of applying catalysts to ionic propulsion devices in such a way that ozone can be essentially eliminated from the effluent air without compromising flow rate.

SUMMARY OF THE INVENTION

In accordance with one aspect, there is disclosed an electrokinetic air propulsion device with a porous support medium coated with ozone-destroying catalyst disposed in the effluent airstream such that air flow is forced through the porous support medium.

In accordance with another aspect, an electrokinetic air propulsion device comprises a housing having an inlet and an outlet. A high voltage electrode and a propulsion electrode in the housing are adapted to generate air flow in the housing. A porous support medium is coated with ozone-destroying catalyst disposed in the housing airstream such that the air flow is forced through the porous support medium.

There is disclosed in accordance with another aspect an electrokinetic air propulsion device comprising a housing having an inlet and an outlet. A high voltage electrode and a propulsion electrode in the housing are adapted to generate air flow in the housing from the inlet to the outlet. A shell is secured to the housing and overlying the outlet. A porous support medium is coated with ozone-destroying catalyst and is disposed in the shell such that the air flow from the outlet is forced through the porous support medium.

It is a feature that the catalyst is manganese dioxide.

It is another feature that the porous support medium is fibrous ceramic. The porous support medium may be fibrous ceramic with cell density in the range of 10-1000 cells/inch. The cell density may preferably be in the range of 50-250 cells/inch.

It is another feature that the porous medium has a thickness in the range of 0.5-2.0 centimeters. The porous medium advantageously may have a thickness in the range of 0.7-1.3 centimeters.

Ionic propulsion devices produce a relatively high air flow rate, and, since no moving parts are used in generating the air flow, there is no pressure gradient and extreme sensitivity to flow reduction by any device that creates resistance to flow. The flow is therefore easily impeded by any obstruction that will restrict flow. This application shows that, by use of a suitable pore size and thickness of a porous support medium, such as honey-comb ceramic fiber catalyst, a sufficient surface area exposure may be obtained which effectively destroys ozone without significantly impeding flow.

Further features and advantages will be readily apparent from the specification and the drawings.

BRIEF DESCRIPTION OF THE DRAWINGS

FIG. 1 is representation of a catalyst block that can be inserted into a flowing air stream originating from an ionic propulsion device;

FIG. 2 is a cross sectional schematic of an assembly of ionic propulsion device and parts for carrier for catalyst in an exploded view;

FIG. 3 is a cross section orthogonal to that of FIG. 2;

FIG. 4 corresponds to FIG. 3 with the catalyst block seated in the carrier;

FIG. 5A corresponds to FIG. 4 with the catalyst block and holder seated on the ionic propulsion device;

FIG. 5C shows a more detailed perspective view of the internal components within FIG. 5A;

FIG. 6 shows the air flow path through the assembly of FIG. 5A;

FIG. 7 shows a specific detailed drawing of the carrier for the catalyst;

FIG. 8 shows performance of a prior art device over time in an enclosed environment;

FIG. 9 shows performance of one or several units of the current invention in an enclosed environment.

DETAILED DESCRIPTION OF THE PREFERRED EMBODIMENT

Figure 5B:
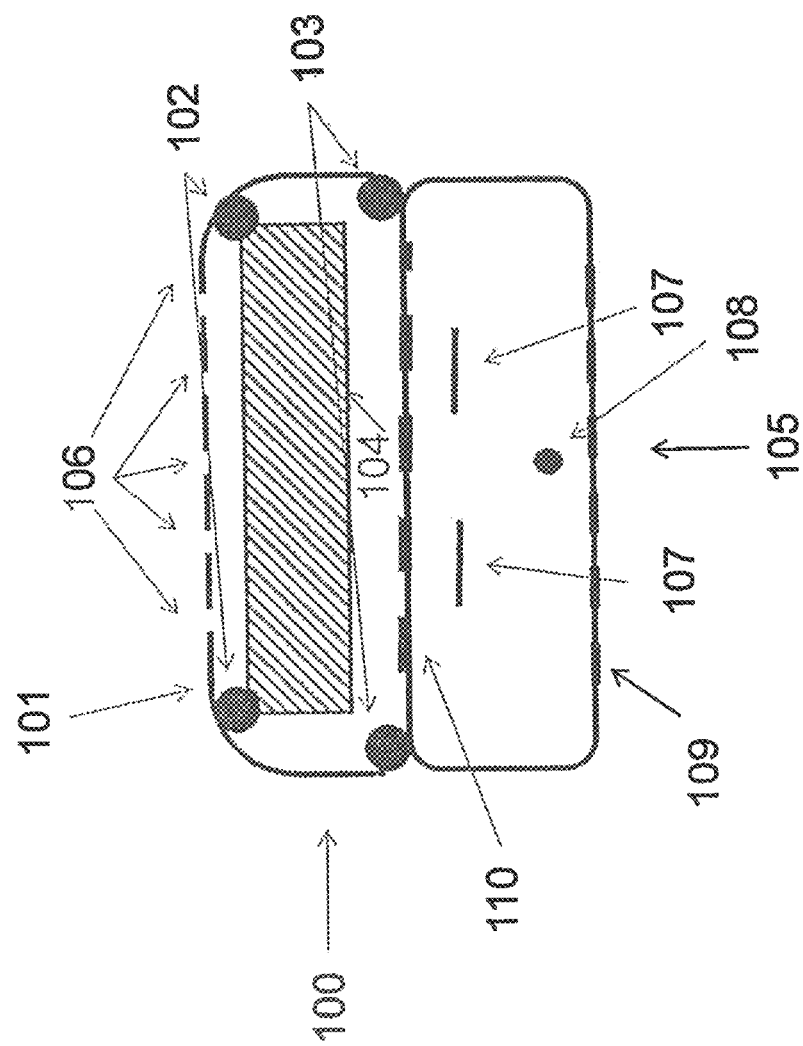
FIG. 5B corresponds to FIG. 5A with more detail of the internal components of the device in a cross-sectional view.
Figure 10:
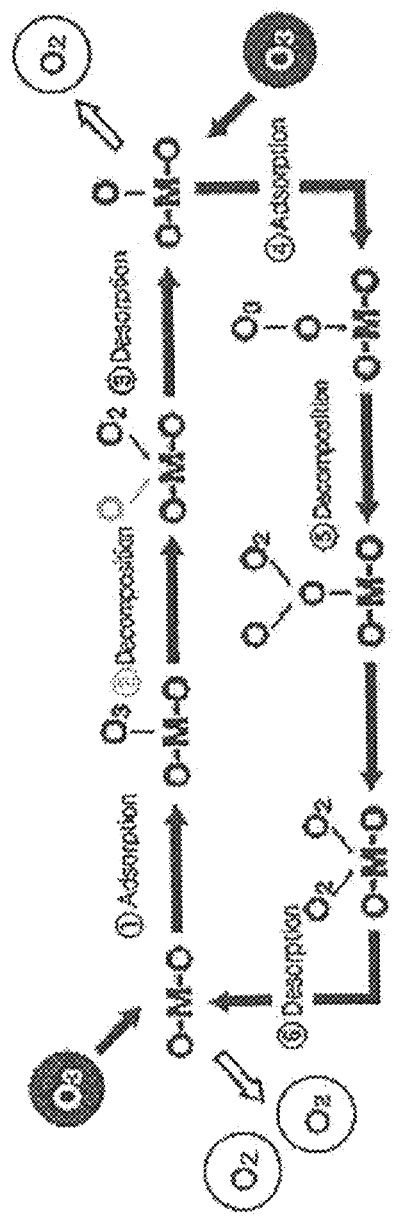
FIG. 10 illustrates a process for ozone being catalytically degraded.

The present invention is based on provision of a block of a porous medium coated with a catalyst such that the entire effluent air from an ionic propulsion device is directed through the catalyst, and the use of a sweet spot in the density and path length through the catalyst such that flow rate is unimpeded but destruction of ozone is complete or near complete. In one aspect a carrier is provided that attaches to a pre-existing ion propulsion device. However, the housing of the device may be modified to accept the catalyst block sealably such that the same functionality is retained.

FIG. 1 shows an example of a porous support medium coated with a catalyst in the form of a block 104 of dimensions length L, width W and thickness H. For simplicity this is also referred to herein as a catalyst block 104. These dimensions can be adjusted to the dimensions of the selected ionic flow device without undue experimentation. Thus, with a device having entrance louvers covering an area of 3 cm×6 cm and exit louvers having dimensions 4.5 cm×10 cm, a suitable catalyst block 104 has dimensions L=11 cm and W=5 cm. While the minimum should not be less than the open area, the maximum is determined by dimensions that are appropriate for the design. The thickness H may be varied according to the needs of the design and air flow rate, Thickness H of 0.5 to 2.0 cm may be used, with 0.7 to 1.3 cm preferred. A thickness H=1 cm, combined with porosity of the catalyst block 104 is selected based on the flow rate, tolerable limits on reduction of the flow rate, and tolerable limits on reduction of ozone. Cell density of 10 to 1000 cells/inch may be used with density in the range of 50 to 250 cells/inch preferred. In the typical example, with thickness 1 cm and honeycomb structure of ceramic fiber aggregate coated with $MnO_2$, a block 104 with 200 cells/inch is optimal. However, the thickness and porosity and nature of the catalyst structure may be varied according to needs. Porosity of the ceramic fiber aggregate may be increased to 500 cells per inch with some loss of flow, but more efficient ozone reduction.

While the fibrous ceramic aggregate material is most suitable, other support structures may be considered, such as paper fiber, fiber board, wood, plastic, metal suitably coated with $MnO_2$. Lau et al describe in U.S. Pat. No. 6,350,417 a method for depositing $MnO_2$ on to a metal surface, and honeycomb fabricated in metal may be up to 10 cells per inch. However, the efficacy falls off with decreasing cell density. A material such as that described in U.S. Pat. No. 4,871,709 is preferable.

FIG. 2 is a schematic cross-section which shows the components of one aspect of an electrokinetic air propulsion device 100 in exploded view. The device 100 consists of a self-contained, pre-existing ionic propulsion device having a housing 105, a clamshell which sealably fits on the housing 105, and holds the catalyst block 104, and gaskets, O-rings or sealing material which provides entrance seals 103 and exit seals 102 for the fibrous ceramic aggregate catalyst block 104. As described more particularly below, the housing 105 contains structure for generating air flow through the housing and into the clamshell 101.

FIG. 3 is essentially the same as FIG. 2, but represents an orthogonal cross-section relative to FIG. 2, and reveals vents 106 in the clamshell 101 which provide the exit pathway for the air flow.

FIG. 4 shows the catalyst block 104 seated in place in the clamshell 101 sealably attached to the O ring exit sealing material 102, thus restricting air exit to the pathway through the catalyst block 104.

FIG. 5A shows the catalyst block 104 and clamshell 101 sealably attached by O ring entrance sealing material 103 to the housing 105 of the ionic propulsion device.

FIG. 5B is similar to FIG. 5A, but shows the details of the ionic propulsion device in the housing 105. Particularly, the housing 105 encloses electrodes which affect the ionic flow. This includes a wire electrode 108 and two plate electrodes 107. A very steep voltage gradient is generated orthogonally to the wire electrode 108 because of the very small cross-sectional area of the wire. The high voltage gradient causes the creation of plasma consisting of charged particles, and kinetic energy is imparted to the charged particles by the high voltage gradient. The resulting net air flow is created by exchange of kinetic energy between charged and uncharged particles, and the net air flow is directed by the juxtaposition of the plate electrodes 107 which are at zero or opposite sign voltage to that of the wire electrode 108. The housing 105 includes inlet vents 109 and outlet vents 110. In typical use, as in known such devices, the wire electrode 108 is subject to a relatively high voltage of approximately 10 kV. The plate electrodes 107, which may be referred to as propulsion electrodes or capture electrodes, capture airborne samples and are at ground voltage. The plate electrodes 107 cause charged particles to be transported with net fluid flow due to ionic propulsion, as is known. This arrangement will typically achieve a flow rate of approximately 100 liters per minute through the housing 105. In a typical run of 5 days, the aerosol particle content of approximately 720,000 liters of air will have been deposited on the plate electrodes 107 for further analysis, with flow unimpeded by the catalyst block 104, and effluent air will be essentially ozone-free.

FIG. 5C illustrates the components of FIG. 5B with the housing omitted for simplicity and showing a perspective view of the organization of the internal components of the device, namely the plate electrodes 107, the wire electrode 108 and the catalyst block 104. As will be appreciated, the device 100 can be formed as a unitary device with a single housing containing the componentry in FIG. 5C. As such, the clamshell 101 would form the cover of the housing 105, as will be readily apparent.

FIG. 6 is similar to FIG. 5B, with the electrodes 107 and 108 omitted, and shows the air flow path through the assembled device 100 when the ionic propulsion device is turned on with arrows 111.

FIG. 7 is an actual 3D CAD drawing for an exemplary clamshell 101 which acts as a support and provides the flow path for air through the catalyst. The clamshell 101 illustrated in FIG. 7 is adapted to fit to a commercially available ionic propulsion device such as the Ionic Breeze Quadra Model IU637. The clamshell 101 is adapted to house the catalyst block 104, as schematically illustrated in prior figures.

FIG. 8 shows the results of performance tests with a commercially available ionic propulsion prior art device, namely the Ionic Breeze Quadra Model IU637 from the former Sharper Image. This device was run for 24 hrs in a small bathroom with HVAC vents closed and a door kept closed. Ozone concentration in the air was measured at 10 second intervals by a Model 106-L ozone monitor from 2B Technologies, Boulder CO. The trace 18 shows the resultant accumulation of ozone. The trace 19 shows the ozone concentration when the Ionic Breeze is equipped with the Sharper Image after-market attachment Ozone Guard and run under the same conditions. The Ozone Guard consists of an open hexagonal structure of metal coated with MnO2, 4 cells per inch and not sealably attached to the Ionic Breeze Quadra Model IU637. It covers 60% of the open area of the air outlet louvers. Thus, this prior art device does not have catalyst covering the entire exit area and it is not sealably attached to the air cleaner. Nor does the prior art device use a higher density honeycomb catalyst support material.

FIG. 9 shows results of performance tests of the device 100, disclosed herein. Five of the devices 100 were run simultaneously in the same room as in the test described relative to FIG. 8 and under the same conditions. The trace 20 shows the devices with no catalyst block 104. The trace 21 shows the results with five devices 100 equipped with catalyst blocks 104 as in FIGS. 6 and 7. The trace 22 shows the results with one device 100 with a catalyst block 104. The trace 23 shows the results for the background with no device running.

It is apparent from the above description and test results that the efficacy of the prior art device in removal of ozone from the air was incomplete. The device has a very open structure (a hexagonal honeycomb of metal presumably coated with a catalyst that is intended to break down the ozone, with 5 mm spacing), and clips on to the effluent side of the Ionic Breeze with no sealing. Further, the device only covers 50% of the effluent air vents. It can be concluded that the device created a very open structure which would minimally impede the air flow in order to avoid reduction of air cleaning capability. Further, since only 50% is actually exposed to the effluent air, presumably the intent was to progressively reduce ozone as air from the room re-circulates through the device. From FIG. 8 this is apparently the case: after about 2.5 hrs there is a significant decrease in the ozone level compared with the control. However, after about 12 hrs the catalyst appears to be overwhelmed and there is no significant difference from the control. The reduction that does occur is only partial and would be considered a problem for the consumer.

Considering FIG. 9, the device 100 is run under "torture test" conditions, with five running simultaneously in the same confined environment as FIG. 8, with no ventilation or air exchange. There is a reduction of ozone from the beginning (Trace 21 compared with 20), although a steady state level accumulates after about 5 hrs. Presumably rate of catalysis and recirculation air flow through the device reach a dynamic equilibrium. This extreme condition reveals the efficacy of the catalysis, but is never likely to occur in normal use. Traces 22 and 23 show no significant difference between background level of ozone and a single device of the current invention running alone. Here, even in a small room with no air circulation or ventilation, no significant level of ozone accumulates with the current invention.

EXAMPLES

Example 1

Assembly of the Device of the Current Invention

The Sharper Image Air Freshener model IU627JPN is used. This compact device has the disadvantage that air inflow and outflow are on the same side. There is thus mixing between the two air streams that reduces the efficiency of the device, since the same air is repeatedly re-processed. It is converted into a uni-directional flow device by cutting louvers into the rear side of the housing. The louvers are 4 mm×30 mm at 2 mm spacing. Eleven such louvers are cut with a milling machine adjacent to the length of the internal high voltage wire. Catalyst, fabricated according to the specifications of U.S. Pat. No. 4,871,709, was NHC-423 from Nikki-Universal, Tokyo, Japan, in the form of blocks 109 mm×52 mm×10 mm thick and being made of ceramic fiber aggregate coated with $MnO_2$ with 200 cells/inch. The clamshell as in FIG. 7 was fabricated by 3D printing, and the dimensions were such that the four corners of the catalyst were wedged into place. Prior to pressing the catalyst block in place, the seal indicated by 102 in the figures was created by means of an O-ring of Ultra-compressible silicone, secured in place with Dow-Corning 700 silicone sealant. The seal indicated by 103 in the figures was created by application of the same sealant at the interface between the clamshell 101 and the body of the Sharper Image device. The function of the device as an aerosol sampler was completed with a cartridge of removable electrodes as described in detail in co-pending U.S. application Ser. No. 14/466,162, the specification of which is hereby incorporated by reference herein. Performance of the device is shown in FIG. 8.

Example 2

Effect of Catalyst on Air Flow Rate

Five devices are assembled as in Example 1. Air flow rate is determined with a hot wire anemometer (Heavy Duty Anemometer, Extech, Nashua, N.H.). The probe is placed at the center of each of the 11 inlet louvers created as in Example 1. The total volume flow is computed from the average of the air velocity at each position. The results for 5 devices are shown in Table 1.

TABLE 1

Air flow of devices (Liters/min).

| Device | Flow without catalyst | Flow with catalyst |
|---|---|---|
| 1 | 112 | 119 |
| 2 | 99 | 109 |
| 3 | 102 | 93 |
| 4 | 131 | 118 |
| 5 | 106 | 133 |
| Mean | 110 | 115 |

The mean difference of 5 liters/min is not considered significant. Similar evaluation of the catalyst NHC-453 with 500 cells per inch and 5 mm thickness resulted in a reduction of flow rate by of 40%, and complete destruction of ozone in effluent. There is thus an optimal combination of cells per inch of catalyst and thickness of catalyst for ozone destruction and flow rate.

The prior art suggests an extremely open structure needs to be used in order to avoid compromising the flow rate of an ionic propulsion device. The device disclosed herein shows that, surprisingly, a finer structure of catalyst may be used without compromising flow rate. While a particular catalyst provided by Nikki-Universal was used in the examples, it is not intended to limit the use and any structure may be used as support material for the catalyst provided that it has sufficient internal surface area. Tatsushima and Sukura in U.S. Pat. No. 4,971,709 which describes how to fabricate catalyst with high internal surface area.

The foregoing disclosure of specific embodiments is intended to be illustrative of the broad concepts comprehended by the invention.

The invention claimed is:

1. An electrokinetic air propulsion device, comprising:
a housing having an inlet and an outlet;
a high voltage electrode and a propulsion electrode in said housing adapted to generate air flow in the housing from the inlet to the outlet; and
a porous ceramic support medium coated with ozone-destroying catalyst is disposed in the housing at the outlet, the porous ceramic support medium having a cell density in the range of 10 to 1000 cells/inch and having a size at least as large as size of the outlet such that the air flow is forced through said porous support medium.

2. A device according to claim 1 wherein the catalyst is manganese dioxide.

3. A device according to claim 1 wherein said porous ceramic support medium is fibrous ceramic.

4. A device according to claim 3 wherein said porous ceramic support medium is fibrous ceramic with cell density in the range 10 to 1000 cells/inch.

5. A device according to claim 4 where the cell density is in the range 50 to 250 cells per inch.

6. A device according to claim 1 wherein said porous ceramic support medium has thickness in the range 0.5 to 2.0 cm.

7. A device according to claim 6 wherein said porous ceramic support medium has thickness in the range 0.7 to 1.3 cm.

8. An electrokinetic air propulsion device, comprising:
a housing having an inlet and an outlet;
a high voltage electrode and a propulsion electrode in said housing, wherein the high voltage electrode and the propulsion electrode are positioned between the inlet and the outlet and wherein the high voltage electrode and the propulsion electrode are configured to be at different potentials to generate air flow in the housing from the inlet to the outlet; and
a porous ceramic medium coated with ozone destroying catalyst, having a cell density in the range 10 to 1000 cells/inch disposed at the outlet, said porous ceramic medium having a size at least as large as size of the housing outlet, such that the air flow from the outlet is forced through said porous ceramic medium.

9. A device according to claim 8 wherein the catalyst is manganese dioxide.

10. A device according to claim 8 wherein said porous ceramic medium is fibrous ceramic.

11. A device according to claim 8 where the cell density is in the range 50 to 250 cells per inch.

12. A device according to claim 8 wherein said porous ceramic medium has thickness in the range 0.5 to 2.0 cm.

13. A device according to claim 12 wherein said porous ceramic medium has thickness in the range 0.7 to 1.3 cm.

* * * * *